May 1, 1956     L. B. PIETROK ET AL     2,743,662
SALT DISPENSER FOR HAY BALERS
Filed May 19, 1952     2 Sheets-Sheet 1

Lawrence B. Pietrok
James O. Phelps
Phillip G. Pietrok
INVENTORS.

May 1, 1956  L. B. PIETROK ET AL  2,743,662
SALT DISPENSER FOR HAY BALERS
Filed May 19, 1952  2 Sheets-Sheet 2
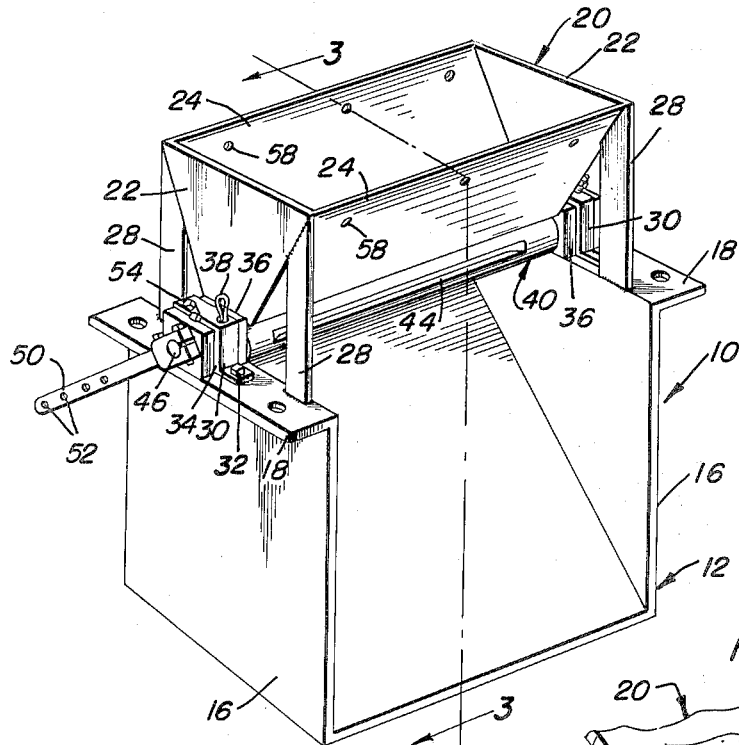
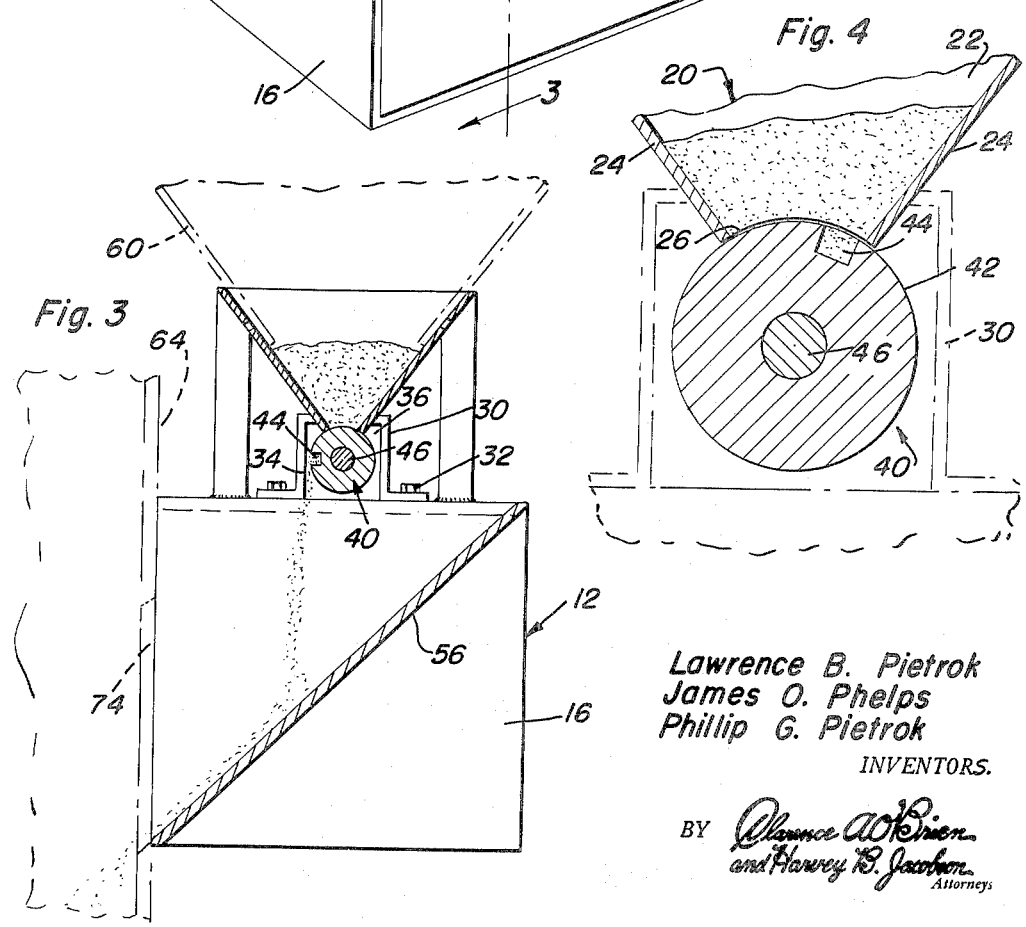
Lawrence B. Pietrok
James O. Phelps
Phillip G. Pietrok
    INVENTORS.

United States Patent Office 2,743,662
Patented May 1, 1956

2,743,662

SALT DISPENSER FOR HAY BALERS

Lawrence B. Pietrok, Stayton, and James O. Phelps and Phillip G. Pietrok, Lyons, Oreg., assignors to Lyons Salt Dispenser Inc., Stayton, Oreg., a corporation of Oregon Application May 19, 1952, Serial No. 288,624

1 Claim. (Cl. 99—235)

This invention relates in general to dispensers, and more specifically to salt dispensers for hay balers.

In many parts of the country alfalfa hay is cut and stored in windrows prior to the actual baling of the same. Due to particular weather conditions, there are always large quantities of green hay in the windrows with the result that when baled the green hay will not cure without salt, but will mold and deteriorate. It is, therefore, desirable to provide an attachment for hay balers which will discharge the desired amount of salt into the loose hay being baled.

The primary object of this invention is to provide an improved salt dispenser for hay balers which may be attached to conventional hay balers now in use for dispensing salt in the hay receiving chute of the hay baler as the same is in the process of being baled.

Another object of this invention is to provide an improved salt dispenser for hay balers, said salt dispenser being of a simplified and compact construction whereby it may be usually secured to and removed from a hay baler and at the same time is economically feasible.

Another object of this invention is to provide an improved salt dispenser for hay balers which has an extremely simplified mechanism whereby mechanical failure thereof is practical eliminated.

Another object of this invention is to provide an improved dispensing means which includes a storage box having a discharge opening at the bottom thereof, said discharge opening being controlled by a dispensing and measuring roller which oscillates therebelow for periodically dispensing salt from the salt box.

A further object of this invention is to provide an improved salt dispenser for hay balers, said salt dispenser being adapted to be connected to mechanism of said hay baler for periodically dispensing salt into the hay receiving chute of the hay baler whereby the salt is evenly distributed throughout the hay being baled.

With these objects definitely in view, this invention resides in certain novel features of construction, combination and arrangement of elements and portions as will be hereinafter described in detail in the specification, particularly pointed out in the appended claim, and illustrated in the accompanying drawings which form a material part of this application and in which:

Figure 2 is an enlarged perspective view of the salt dispenser of Figure 1 and shows the general mechanism thereof, an extension for the salt box being omitted;

Figure 3 is an enlarged transverse vertical sectional view taken substantially upon the plane indicated by the section line 3—3 of Figure 2 and shows the general relationship of the salt dispenser with respect to a wall of a hay receiving chute of the hay baler of Figure 1;

Figure 5:
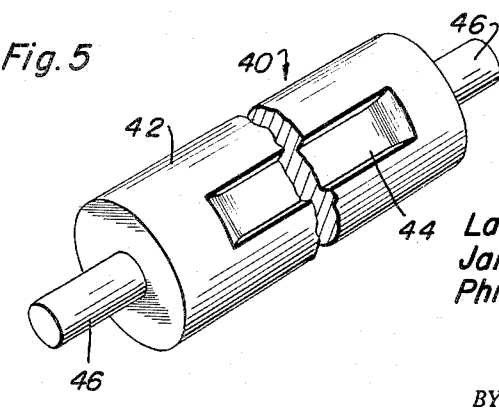

Figure 4 is an enlarged fragmentary transverse vertical sectional view taken through a portion of the salt dispenser of Figure 2 and shows the construction of a measuring and dispensing roller and the relationship thereof to the discharge opening of a salt storage box; and Figure 5 is an enlarged perspective view of the measuring and dispensing roller and shows the general construction thereof, the central portion of the roller being omitted.

Similar characters of reference designate similar or identical elements and portions throughout the specification and throughout the different views of the drawings.

Referring now to the drawings in detail, it will be seen that there is illustrated in Figure 2 the salt dispenser 10, which is the subject of this invention. It will be noted that the salt dispenser 10 includes a support, which is referred to in general by the reference numeral 12 and is generally U-shaped in cross section, said support 12 including upstanding side flanges 16 and narrow outwardly extending horizontal flanges 18.

Supported by the support 12 is a salt storage box, which is referred to in general by the reference numeral 20. The salt storage box includes a pair of substantially triangular end walls 22 which are in spaced parallel relation and are connected together by a pair of downwardly diverging side walls 24. As is best illustrated in Figure 4, the side walls 24 have their lower ends spaced to form a longitudinally extending discharge opening 26.

The salt storage box 20 is secured to the support 12 by a plurality of vertical supports 28 carried by the salt storage box 24. It will be noted that each of the vertical supports 28 is secured to an upper corner of a respective side wall 24 and has its lower end secured to the outwardly directed flange 18 of the support 12. It will be understood that the length of the vertical supports 28 are such that the discharge opening 26 of the salt storage box 22 is spaced above the surface of the outwardly directed flanges 18.

Secured to each of the flanges 18 intermediate its ends is an inverted U-shaped mounting bracket 30 which is provided with outwardly extending flanges connected to the respective flange 18 by fasteners 32. It will be noted that each of the mounting brackets 30 forms in combination with its associated flange 18 a substantially square opening 34. Disposed within each square opening 34 is a square cross sectional bearing block 36, the bearing block 36 being secured within its respective mounting bracket 30 by a pin 38 carried by the mounting bracket.

Referring now to Figure 5 in particular, it will be seen that there is illustrated a dispensing and measuring roller, which is referred to in general by the reference numeral 40, the roller being adapted to control flow of salt through the discharge opening 26 of the salt storage box 20. It will be noted that the roller 40 is provided with a cylindrical body portion 42 having an elongated axially extending dispensing and measuring pocket 44 therein. The body portion 42 has projecting from the ends thereof concentric journal portions 46.

It will be noted that the journal portions 46 of the roller 40 are mounted within the bearing blocks 36 for rotation with respect thereto and that the cylindrical body portion 42 is disposed beneath the discharge opening 26 of the salt storage box 20 for normally closing the same. Adjustably secured on the end of one of the journal portions 46 is a crank arm 50 for oscillating the roller 40. The crank arm 50 is provided with a plurality of spaced apertures 52 adjacent the free end thereof for receiving one end of actuating means therefor. It will be noted that the bearing blocks 38 are provided with grease fittings 54 to insure proper lubrication of the journal portions 46.

During the normal operation of the salt dispenser 10, the dispensing and measuring pocket 44 of the roller 40 oscillates from a position in alignment with the discharge opening 26 of the salt storage box 20, as is best illustrated in Figure 4, to a salt dumping position, as is best illustrated in Figure 3. Salt dumped from the pocket 44 is dropped into a downwardly sloping chute which is formed by a downwardly sloping plate 56 which extends between the side flanges 16 of the support 10 from the upper side at one end to the bottom side of the opposite end thereof.

Referring now to Figures 2 and 3 in particular, it will be seen that the side walls 24 of the salt storage box 20 are provided with a plurality of spaced apertures 58 which are adapted to receive conventional fasteners (not shown). The conventional fasteners are intended to be utilized for securing an outwardly projecting extension 60 to the salt storage box 20 in order to increase the capacity thereof.

Figure 1:
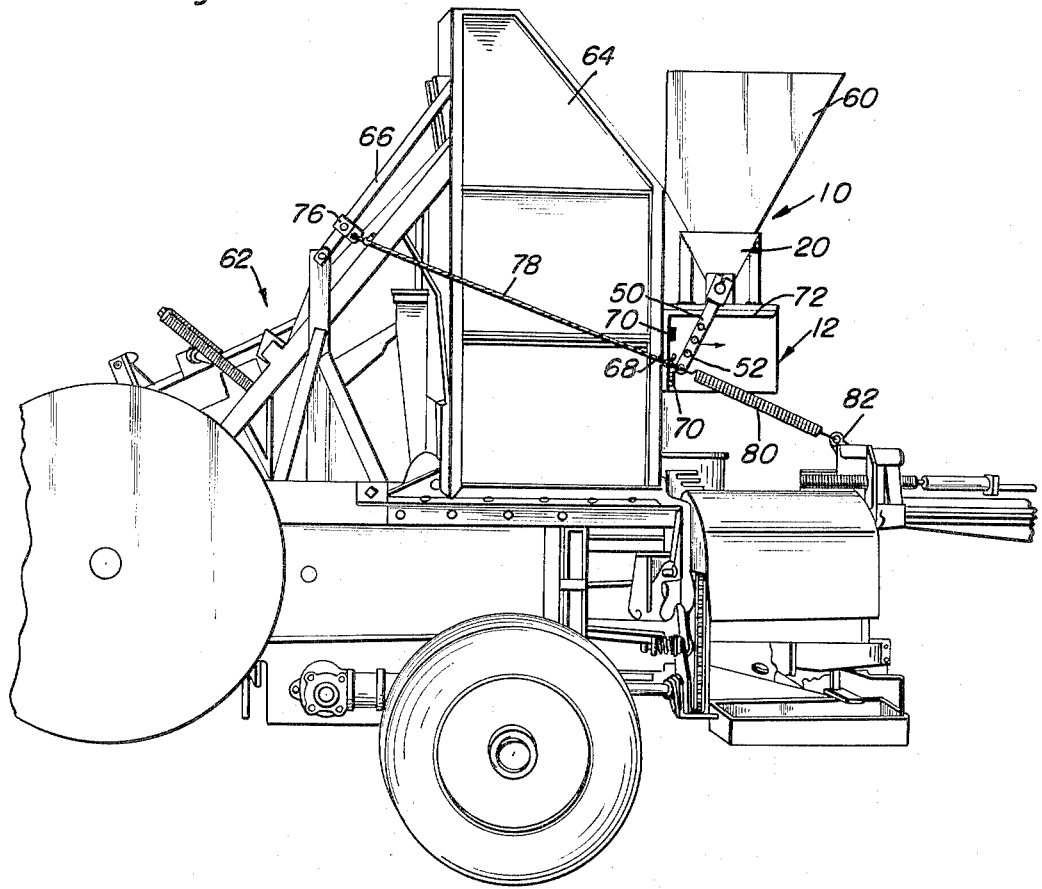
Figure 1 is a fragmentary side elevational view of a conventional hay baler having mounted thereon the salt dispenser, which is the subject of this invention, the salt dispenser being connected to actuating mechanism of the hay baler.

Referring now to Figure 1, it will be seen illustrated one of the many types of conventional hay balers, which is referred to in general by the reference numeral 62. The hay baler 62 is adapted to receive loose hay which is compressed and tied into bales for storage purposes. The hay baler 62 includes a loose hay receiving chute 64 in which loose hay is adapted to be disposed and compressed by a plunger (not shown). The plunger reciprocates within the hay receiving chute 64 and is actuated by an oscillating arm 66 disposed forward of the hay receiving chute 64 and actuated by drive means of the hay baler 62.

It will be noted that the hay baler 62 has secured to the rear side of the hay receiving chute 64 the salt dispenser 10, which is the subject of this invention. The salt dispenser 10 is secured to the rear wall of the hay receiving chute 64 by a pair of spaced parallel angle brackets which have vertical flanges 68 secured to the rear wall of the hay receiving chute 64 by fasteners 70. The angle brackets also have horizontal flanges 72 which underlie the outwardly directed flanges 18 of the support 12 and are secured thereto. As is best illustrated in Figure 3, the rear wall of the hay receiving chute 64 is provided with an enlarged opening 74 which is in alignment with the chute portion of the salt dispenser 10 and whose lower edge is in alignment with the sloping plate 56 forming a major portion of the chute.

Mounted on the oscillating arm 66 is an adjustable bracket 76 to which is secured one end of a flexible member 78. The other end of the flexible member 78 is secured through one of the apertures 52 of the crank arm 50. Also secured in said one aperture 52 of the crank arm 50 is one end of a tension spring 80 whose other end is connected to a bracket 82 carried by the rear portion of the hay baler 62.

In normal operation, as the actuating arm 66 moves downwardly in order to permit downward movement of the plunger disposed within the hay receiving chute 64 to compress hay received therein, the bracket 76 is moved towards the bracket 82 with the result that the tension spring 80 is allowed to pivot the crank arm 50 in a counter-clockwise direction. Pivoting of the crank arm 50 results in the oscillation of the roller 40 with the result that salt is dispensed to the hay receiving chute 64 into the hay positioned therein. When the actuating arm 66 moves upwardly, the bracket 76 moves away from the bracket 82 with the result that the crank arm is pivoted in a clockwise direction to its normal position, as is illustrated in Figure 1.

It will be understood that the salt dispenser 10 may be secured to any type of hay baler and that various types of mounting means may be utilized. Also, it will be understood that it is not necessary to connect the crank arm 50 to the actuating arm for the plunger of the hay baler as any periodically reciprocating, oscillating, or rotating member may be utilized provided it is traveling at substantially the same rate as the plunger of the hay receiving chute.

The operation of this device will be understood from the foregoing description of the details thereof, taken in connection with the above recited objects and the drawings. Further description would appear to be unnecessary.

Minor modifications of the device, varying in minor details from the embodiment of the device illustrated and described here, may be resorted to without departure from the spirit and scope of this invention, as defined in the appended claim.

Having described the invention, what is claimed as new is:

In combination with a hay baler including a hay receiving hopper with a vertical side wall having a horizontally elongated opening therein, and an actuating arm for a compression plunger, a salting attachment comprising a pair of aligned spaced vertical plates mounted on said side wall of the hopper at each end of the opening therein, an elongated downwardly sloping plate interconnecting the pair of vertical plates and having the lower edge thereof abutting the side wall of the hopper at the lower edge of the opening whereby the sloping plate forms a chute for guiding salt through the entire length of the opening into the interior of the hopper, a salt storage bin mounted on said pair of vertical plates and extending transversely thereof in overlying relation to the upper portion of the sloping plate, said bin having upwardly diverging plates terminating in spaced relation at their lower ends for forming a discharge slot, a cylindrical dispensing and measuring roller rotatably mounted on the upper end of said pair of plates with a portion of the periphery thereof received in the discharge slot thereby forming a closure therefor, said roller having a longitudinally elongated groove in the periphery thereof, said groove being equal to the length of the discharge slot for receiving a predetermined quantity of salt through the discharge slot, a laterally extending arm connected to said roller, spring means for urging the roller to a position for dumping salt from the groove onto the sloping plate, and a flexible member interconnecting said lateral arm and the plunger actuating arm for rotating said cylinder for moving the groove from a dumping position to a position in alignment with the discharge slot for receiving another quantity of salt for dispensing onto the plate throughout the length thereof whereby the salt will be discharged evenly across substantially the entire width of the hay hopper for thoroughly intermingling the salt and hay.

References Cited in the file of this patent
UNITED STATES PATENTS

| Number | Name | Date |
|---|---|---|
| 186,859 | Loyd | Jan. 30, 1877 |
| 858,508 | Goldman | July 2, 1907 |
| 934,182 | Jopling | Sept. 14, 1909 |
| 1,275,819 | Wright | Aug. 13, 1918 |
| 1,507,867 | Stubbs | Sept. 9, 1924 |
| 1,636,910 | Hardy | July 26, 1927 |
| 2,411,220 | McDargh | Nov. 19, 1946 |
| 2,503,416 | Russell | Apr. 11, 1950 |
| 2,504,279 | Sanner | Apr. 18, 1950 |
| 2,567,760 | Boughan | Sept. 11, 1951 |
| 2,628,002 | Peterson | Feb. 10, 1953 |
| 2,642,793 | Heisey | June 23, 1953 |